INVENTORS
FRANCIS NICHOLAS FOSSATI
ROBERT RUPPE UNTERBERGER

BY
ATTORNEYS

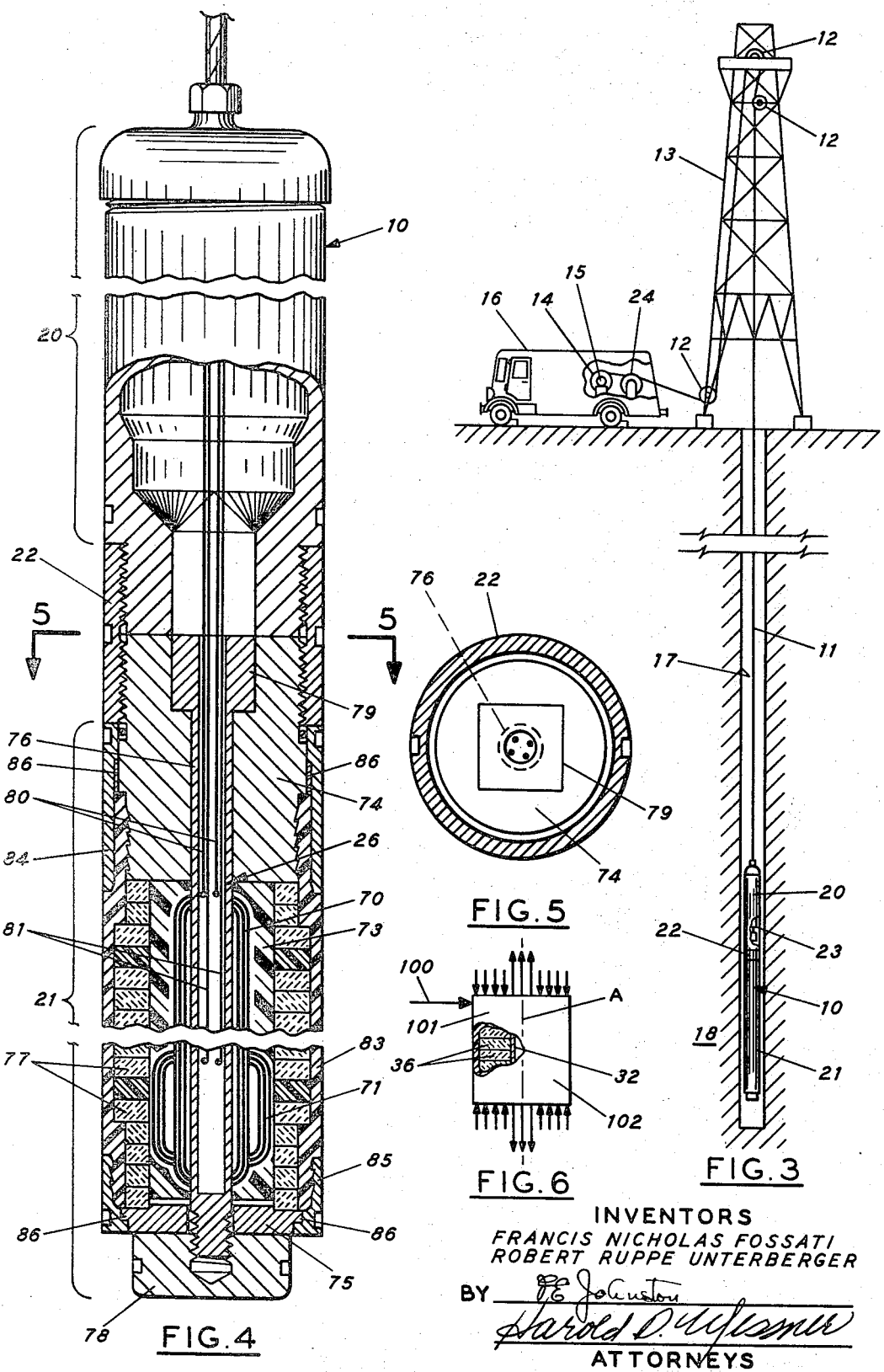

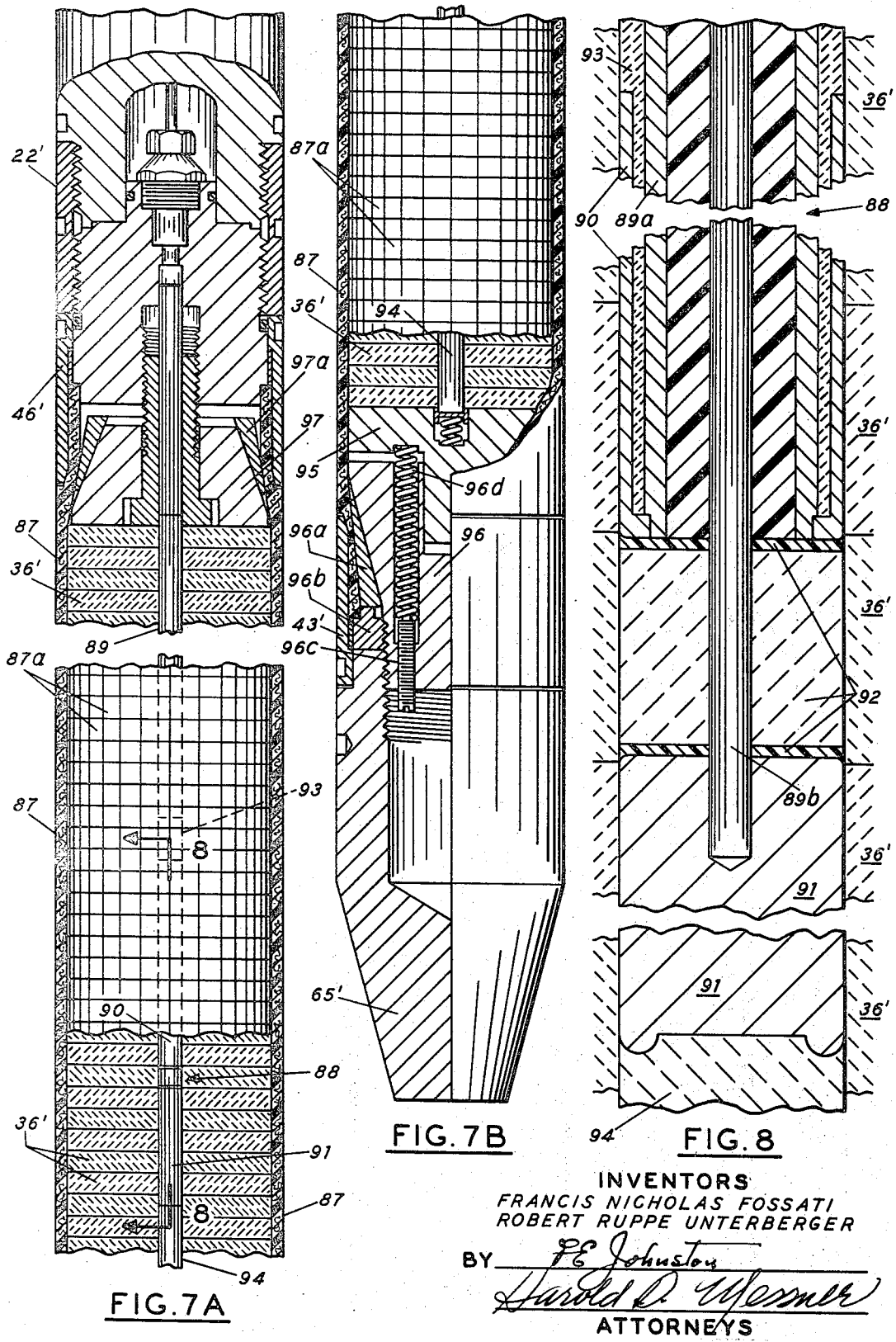

United States Patent Office 3,403,328
Patented Sept. 24, 1968

3,403,328
HIGH-STRENGTH LOGGING TOOL HOUSING HAVING A COMPRESSIBLY STRESSED SIDE WALL
Francis Nicholas Fossati, Lafayette, and Robert Ruppe Unterberger, Fullerton, Calif., assignors to Chevron Research Company, San Francisco, Calif., a corporation of Delaware
Filed Nov. 14, 1966, Ser. No. 594,096
12 Claims. (Cl. 324—6)

ABSTRACT OF THE DISCLOSURE

In a logging sonde for movably positioning an electrically insulated diagnostic element adjacent to an earth formation penetrated by a well bore to determine an electrical characteristic of the earth formation, the mechanical rigidity thereof is improved by forming the sonde of an axially elongated central housing adapted for movement through the borehole, the housing including a side wall section defining a cavity for support of the diagnostic element therein and an axially loading means coextensive with the side wall section. By compressibly stressing the side wall section relative to either (i) another section exterior of the side wall, on (ii) a centrally located core or mast, the columnar stiffness of the sonde to lateral loads is improved. The high-strength sonde has especial advantage in movably supporting electromagnetic logging equipment within a borehole penetrating an earth formation, such as a salt dome, for measuring the distance to a discontinuity therein.

---

The present invention relates to a high-strength exploration sonde for accommodating and transporting exploration equipment, such as high-energy electromagnetic radiation, nuclear, electrical, induction or acoustic logging equipment, through a borehole penetrating an earth formation to measure formation geophysical and/or geological characteristics.

Although not limited thereto, the invention has primary utility in a system employing antennas similar to those used in surface and airborne radar; however, in the environment of the present invention, the antenna and associated radio frequency circuitry are to be located within a borehole penetrating a salt dome and operated for mapping, at depth, the shape of the dome by electromagnetic wave reflection techniques. A description of this type of logging technique may be found in a copending application for "Method of Mapping a Salt Dome at Depth by Measuring the Travel Time of Electromagnetic Energy Emitted from a Borehole Drilled Within the Salt Dome," William T. Holser, Robert R. Unterberger and Stanley B. Jones, Ser. No. 253,339, filed Jan. 23, 1963, now Patent No. 3,286,163 and assigned to the assignee of the present application.

A primary object of the invention is the provision of a novel exploration sonde and method of forming same in which the sonde is provided with increased columnar stiffness.

In accordance with the present invention, columnar stiffness is improved by compressibly stressing a longitudinal side wall section of the sonde (either the entire length of the sonde or at least a portion thereof) relative to either another section of the side wall or to a centrally located core or mast. The resulting stress distribution in a transverse plane normal to the sonde axis creates a structure resistive to both compressive and bending loads resulting from operation of the long, slender sonde in and about a borehole.

In the art of logging earth formations, the modern exploration sonde has attained an appreciable length to accommodate larger quantities of complex exploration equipment employed to measure desired geophysical or geological characteristics of earth formations. While the longer sondes contain more equipment capable of measuring more details of an earth formation, the increased length has increased the incidence of mechanical failure due in part to (1) the increased span over which transverse loads may act (primarily during topside handling of the sonde and to a lesser extent during the period of the traverse of the sonde through the borehole) and (2) the limited choice of materials having both compatible electric and magnetic properties and adequate tensile strength to withstand the loads and shocks of field operations.

During uphole handling of the sonde, for example, the sonde must be placed in a vertical position for entry into the borehole. As the sonde is usually carried to the well site in a flat position, a cable and winch are usually employed to erect the sonde. During erection the sonde frequently is supported only at its ends until enough cable is drawn over the sheave to raise the sonde clear of the ground. Accordingly, the sonde is subject to bending loads at its ends due to its own distributed weight. After the sonde is vertically positioned, the free end of the slender sonde may be bumped as the tool enters the hole. Additional shocks may occur as the sonde traverses the borehole or is withdrawn from the hole for storage. With regard to electromagnetic contour logging in salt domes, the sondes are especially conducive to mechanical failure because of the length required to support the antenna system, which may be as long as 30 to 40 feet.

In accordance with the present invention, an exploration sonde having improved columnar stiffness is constructed having a lower sonde housing consisting of a concentric side wall section within which elements of diagnostic equipment may be located. The side wall section is preferably formed of a series of surface-contacting discs capable of passing magnetic or electric energy from the diagnostic equipment into the earth formation under exploration. The discs are of a material having a relatively high ultimate strength in compression; however, the tensile strength can be relatively low.

In accordance with one aspect of the present invention, a central core or mast preferably formed of high-strength metal, such as steel or other compatible material, is located interior of and coextensive of the discs and is longer than the side wall section by say 2 to 6 inches. It is also fitted with a rotatable and axially movable connector of a larger diameter than the central core for developing axial loads of the ends of the discs in a direction parallel to the axis of the sonde. In producing the axial loading, the connector cooperatively engages with the central core to force the discs into compressive contact with each other. Preferably, the thermal coefficients of expansion of the materials forming the side wall section and the core are matched to prevent differential movement during operation of the sonde within the high temperature environment of the borehole.

In accordance with another aspect of the present invention, a sheath capable of passing the electromagnetic energy into the formation is located at the radial edges of the discs. A movable connector is fitted in operative contact with the sheath and the discs. The connector is adapted to tensionally stress the sheath relative to the discs to provide axial loading at the ends of the side wall section.

Further objects and advantages of the invention will become more apparent from the following detailed description of several embodiments of the invention taken in conjunction with the accompanying drawings which form a part of this specification.

In the drawings:

FIGURE 3 is a schematic representation of one of the uses of the logging sonde in accordance with the present invention;

FIGURE 4 is a side elevation, partially cut away, of a second embodiment of the logging sonde of the present invention;

FIGURE 5 is a sectional view taken along line 5—5 of FIGURE 4;

FIGURE 6 is a free body diagram of the forces acting over a segment of the logging sonde of FIGURE 1;

FIGURES 7A and 7B are partial side elevations of a third embodiment of the logging sonde of the present invention; and FIGURE 8 is a sectional view of a portion of the improved logging sonde taken generally along line 8—8 of FIGURE 7A.

Figure 1:
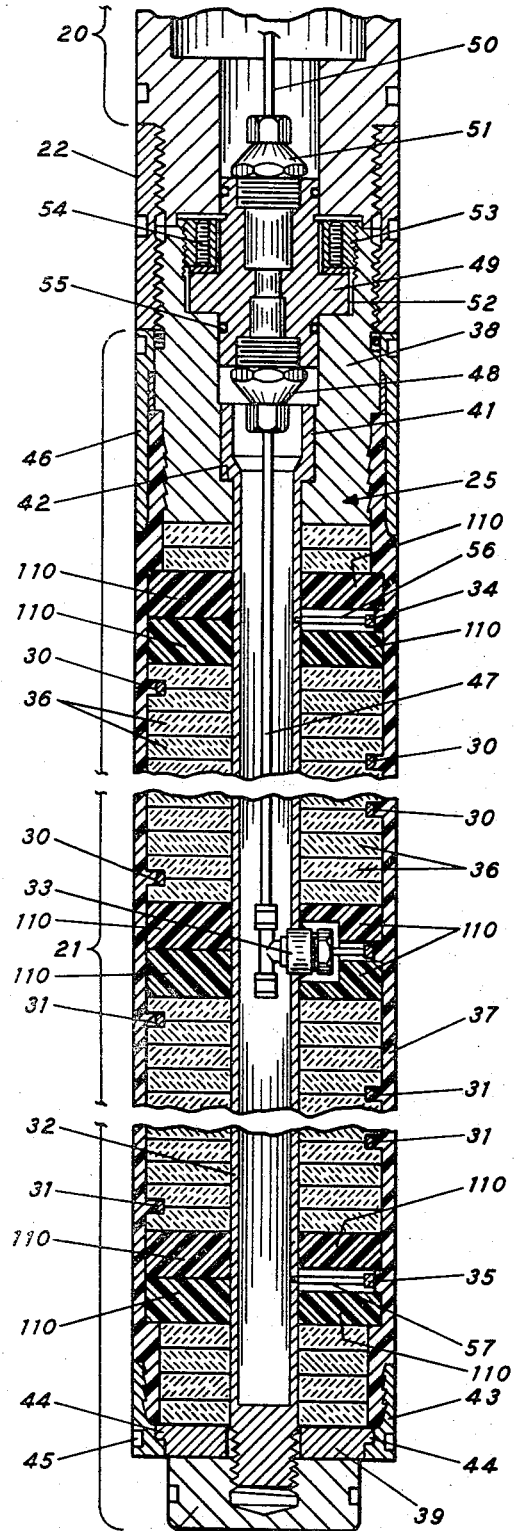
FIGURE 1 is a sectional view of a portion of a logging sonde illustrating one aspect of the present invention.

Referring now to FIGURE 3, a section of an earth formation 18 is shown penetrated by a borehole 17. As illustrated, a logging sonde 10 constructed in accordance with the present invention is attached to a logging cable 11, which in turn is connected through sheaves 12 on derrick 13 to cable drum 14 on hoist truck 16. To provide movement of the sonde along successive sections of the formation, the drum 14 is driven by a variable speed motor 15 located within the hoist truck 16. During traverse of the formation, diagnostic prospecting equipment 23 encased within an enclosure formed by upper and lower housings 20 and 21 and collar 22 is energized to derive data concerning the content or composition of the adjacent formation. The data derived by the diagnostic equipment are recorded as a function of depth of the sonde measured by means of sheave 24 connected between the drum 14 and the derrick 13.

The prospecting equipment 23 within the sonde may include the elements of a radio frequency antenna system, such as generally indicated at 25 in FIGURE 1, for the purpose of mapping at depth the shape of a salt dome as an aid in locating accumulations of oil at the interface of the dome and the surrounding sedimentary formation. Alternatively, as indicated in FIGURE 4, the prospecting equipment may consist of a nuclear magnetic logging system, generally indicated at 26, for detecting the presence of fluids, such as hydrocarbons, within an earth formation by identifying the nuclear magnetic resonance characteristic of protons in such fluids. Furthermore, other elements of circuitry of logging processes, such as nuclear induction or acoustic logging equipment, may be utilized within the sonde of the present invention.

Reference should now be had to FIGURE 1 wherein a logging sonde 10 of FIGURE 3 enclosing antenna system 25 as illustrated in partial section. The antenna system 25 within the sonde has particular utility in mapping the shape of a salt dome surrounding a borehole (not shown). A method of mapping the sides of a salt dome is described in a previously identified copending application, Ser. No. 253,339, of William T. Holser, Robert R. Unterberger and Stanley B. Jones. In that method, electromagnetic radiation is emitted from an antenna within a borehole penetrating the salt body. As the interface of the salt body forms a discontinuity, the radiation is reflected back to the antenna for detection.

The antenna illustrated in this application is useful in that logging method and consists of end-to-end aligned first and second helical conductors 30 and 31 of FIGURE 1 concentric to a centrally located conducting cylinder or core 32. The helical conductors are wound about the central conducting core in an opposed winding sense well understood in forming helical antennas (see "Antenna Engineering Handbook," Henry Jasik, editor: McGraw-Hill, 1963, pages 7–9 through 7–12). The helical conductors extend in the same annular direction about the core but proceed in opposite axial directions from a single feed point at adapter 33 to respective ends 34 and 35.

Figure 2:
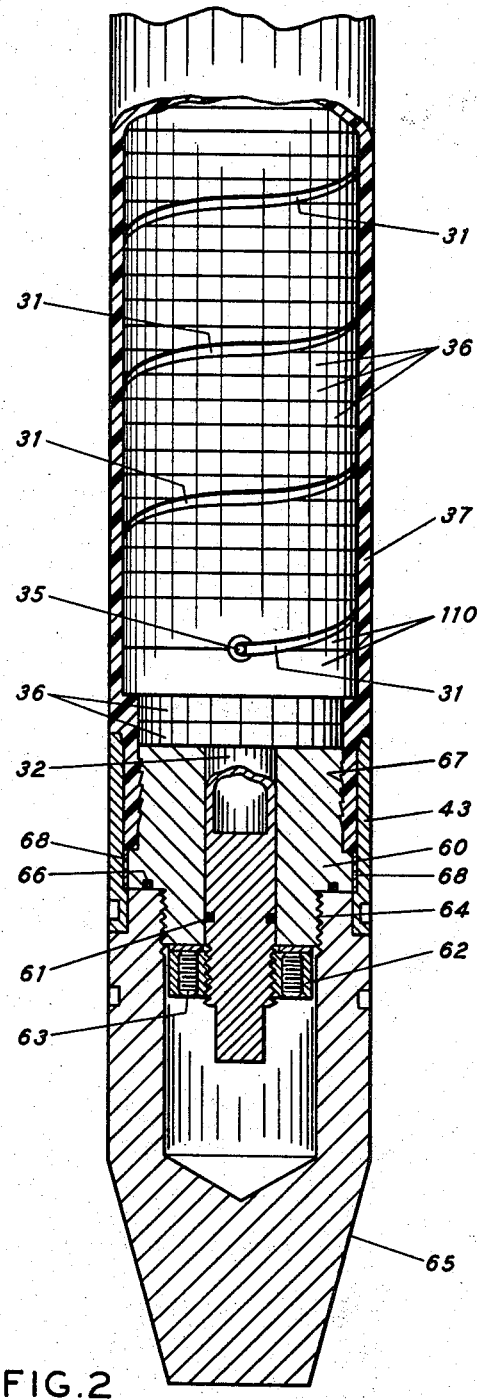
FIGURE 2 is an elevational view of the logging sonde of FIGURE 1, partially cut away, illustrating an improved connecting means at one end of the sonde.

Across the central portion of the sonde, the helical conductors are maintained in correct winding relationship by means of disc members 36. The disc members 36 are mechanically aligned and in surface contact with the central conducting core 32 and electrically insulate the core from the helical conductors 30 and 31. To support the helical conductors, the discs are provided with serpentining grooves, as indicated in FIGURE 2. To effect capture of the conductors 30 and 31, a room temperature vulcanized silicone rubber compound mixed with a sufficient amount of the proper dielectric compound, such as titanium dioxide to give the overall mixture a dielectric constant matching that of the discs, may be positioned within the grooves after the conductors have been inserted. By careful selection of the amount of the dielectric compound, a dielectric constant of 5.9 at a few hundred megahertz may be obtained along with a relatively low dissipation factor, for example .006. Over the central region of the antenna, diametrical equality of the discs is maintained; however, discs outside the ends of the helical conductors 30 and 31 are preferably of reduced diameter to aid in forming knurled surfaces for connection to resinous cover 37.

As illustrated in FIGURE 6, the stress distribution of the disc members 36 and 110 differs markedly from that of the central core 32. As illustrated, the discs 36 are provided with stress vectors whose directions, as shown, indicate axially compressive loading at the ends of the discs. Core 32, however, is provided with stress vectors whose direction indicates tensile loading on the core. As the loads are axially applied, the stresses are uniformly distributed over the intermediate cross section of the discs and core. Thus, should the sonde be subject to bending loads, say in the direction of arrow 100, lateral deflection of the sonde—and possible mechanical failure—can occur only if segment 101 can be placed in tension as the segment 102 is placed in compression. Thus an increment of the bending load is needed to overcome the prestressed internal forces of the disc members which, in effect, increases the stiffness as well as ultimate strength of the sonde in bending.

To provide the desired compressional stress distribution along the side wall section of the lower sonde housing, the disc members 36 have relatively broad, flat surfaces in surface contact with the similarly oriented surface of neighboring discs. At the upper end of the side wall section, the last reduced diameter disc contacts support base 38; the last reduced diameter disc at the bottom contacts back-up plate 39 of the lower sonde housing. The discs are placed in compression in a direction parallel to the longitudinal axis of the sonde by the attachment of an end collar 40 to the threaded end at the bottom of the central core 32. Accordingly, as collar 40 is threaded to the lower end of central conducting core 32, the members 36 are clamped, in compression, between back-up plate 39 and support base 38.

Compressive loading of the disc members 36 also places the central conducting core 32 in tension as the latter is stretched downwardly by the reactive forces created by the compression of the discs. As tensioning of the central conducting core occurs, upper flange 41 of the conducting core 32 also moves downwardly into contact with shoulder 42 of the central recess of support base 38. Since the support base 38 is secured to the upper housing through collar 22, the securing of the core 32 to the support base 38 fixes these parts in a permanent axial relationship.

To prevent rotation of the conducting core as the stressing collar 40 is threaded onto the core 32, the upper flange 41 and its attaching central recess in base 38 may be rectangular in cross section, as indicated in FIGURE 5. However, the core may be attached to the base 38 in a more conventional fashion, as by a key or a series of keys imbedded at the mating surfaces of the parts.

At the lower end of the housing, the back-up plate 39 is also prevented from rotating as stressing collar 40 is threaded onto the core 32. At this end a ferrule 43 is keyed to the back-up plate 39 at diametrically opposed keyways 44. The ferrule is adapted to be held stationary by a suitable spanner wrench engaging spanner holes 45 at the outside surface. When so held, the ferrule 43 prevents rotation of the back-up plate 39 as the stressing collar 40 is attached.

After attachment of the stressing collar, the ferrule 43 may be removed to allow surface application of a resinous material to form the resinous cover 37. Thereafter, the lower and upper ends of the cover may be machined to accommodate the lower ferrule 43, as well as upper ferrule 46, and thereby provide protection of these exposed, slightly porous, surfaces of the cover. After the cover is fabricated, the ferrule 43 may be permanently attached to the back-up plate 39 by means of machine screws (not shown).

Within the sonde, bulkhead 49 is located adjacent to the upper housing and is provided with an enlarged collar 52. Collar 52 is accommodated within a recess within support base 38 and supports a centrally aligned connector onto which coaxial connectors 48 and 51 are threaded. Back-up nut 53 secures the bulkhead relative to the support base 38. The nut 53 includes a series of circumferentially spaced set screws 54 that seal the bulkhead and the support base along O-ring 55. Should the lower housing 21 mechanically fail during operations within a borehole, the O-ring 55 will prevent fluids from inundating the expensive electronic circuitry in the upper housing 20.

Mechanical connection of the upper and the lower sonde housings is provided by the union collar 22 after electronic circuitry has been positioned in the upper tool housing and, similarly, after the antenna assembly has been supported in the lower sonde housing. The union collar 22 is fitted with a first series of screw threads for appropriate connection to the upper tool housing and a second series of threads of opposed winding sense for contact to mating threads of the lower antenna housing. Accordingly, electrical connection of the helical conductors 30 and 31 and the central conducting core 32 can be made to a source of electromagnetic energy in the upper tool housing without twisting the transmission lines 47 and 50 as the upper and lower sonde housings are connected. As the lower housing is connected to the union collar 22, the upper ferrule 46 is fitted to the upper end of the resinous cover 37 and is brought into abutting contact with the collar.

In mapping a salt dome from a borehole, the antenna must, of course, connect to the source of electromagnetic energy. Usually the energy source is supported within the upper housing of the sonde to minimize power losses. To interconnect the source and the antenna, transmission line 47 connects adapter 33 to coaxial connectors 48 and 51 at the bulkhead 49 and thence through transmission line 50 to the source of electromagnetic energy.

Control of the actuation of the antenna in proper sequence is accomplished by means of control circuitry at the earth's surface connected to the upper housing of the sonde by a transmission line or conventional electrical conductors within cable 11. The topside circuitry also may control additional antenna circuitry within the upper housing of the sonde, such as a receiver, a duplexer and a tuner, as well understood in the radio frequency electronics art.

In operative sequence, when the antenna is operatively connected to the source, energy passes through the adapter 33 and a potential is set up between conducting core 32 and the conductors 30 and 31. As a result, electromagnetic radiation is launched from the antenna which, owing to the geometrical configuration of the antenna, is directional in elevation but nearly omnidirectional in azimuth. The antenna is disconnected from the transmitter and connected to a receiver by a duplexer to detect the time of arrival of the earliest reflected electromagnetic wave. The time of travel of the wave from the antenna to the reflector and back is recorded in accordance with the depth of the sonde below the earth's surface to allow determination of the range to the nearest side wall of the salt body.

During emission of the electromagnetic field, the electromagnetic waves traveling along the helical conductors and conducting core are progressively attenuated as power is radiated. Accordingly, the helical conductors may be terminated in contact with the conducting core 32 as by means of conducting posts 56 and 57 as indicated without unduly affecting the electrical characteristics of the antenna.

Ceramic and refractory materials suitable for forming the disc members 36 must be provided with compatible electrical properties for use in electromagnetic logging of salt domes and mechanical properties to allow the sonde to be suitably compressively stressed, as previously discussed. The materials may have a relatively low tensile strength, but the materials should have an average linear coefficient of expansion matched to that of the central conducting core. Accordingly, where the core is composed of steel, the average coefficient of expansion of the material forming the disc should, therefore, be about $6.6 \times 10^{-6}$ in./in./° F. Furthermore, the dielectric constant of these materials should be matched to that of the formation through which the electromagnetic energy propagates. As all earth formations have dielectric constants greater than that of air, the employment of dielectric materials surrounding the antenna, such as discs 36, not only shortens the physical dimensions required for operation of the antenna but also facilitates its design since conventional antenna theories associated with a homogeneous medium can be applied. In this regard, a series of discs formed of steatite and a dielectrically loaded epoxy material—having the following electrical and mechanical properties—have been found to be suitable for logging operations within a salt dome in a temperature range from about 0 to 300° F.

| | Steatite discs | Dielectrically loaded epoxy discs |
|---|---|---|
| Dielectric constant at 100 mHz | 6.1 | 5.9 |
| Loss factor at 100 mHz | .005–.016 | .01–.02 |
| Compressive strength, 1,000 p.s.i. | 66–90 | 25–35 |
| Coefficient of linear expansion, in./in./° F | $3.66 \times 10^{-6}$ | $30 \times 10^{-6}$ |
| Ultimate strength, p.s.i.: | | |
| Tension | $4.8–15 \times 10^3$ | [1] $5–14 \times 10^3$ |
| Compression | $66–90 \times 10^3$ | [1] $25–35 \times 10^3$ |

[1] Approx.

To illustrate the difference in the materials forming the discs, the epoxy discs are indicated by the numeral 110, whereas the steatite discs are at 36 in FIGURE 1. When forming the epoxy discs, a suitable epoxy resin and catalyst are cast in a mold along with a dielectric-enhancing compound, such as titanium dioxide of barium titanite, in the proper amount to form a mixture having the above properties. In order that the average linear expansion of the series of disc members 36 in the temperature environment of a borehole is equal to that of the central conducting core, the number and thickness of the dielectrically loaded epoxy discs 110 must be adjusted in light of the number and thickness of the steatite discs. To facilitate construction, the dielectrically loaded epoxy discs 110 may be of greater thickness as illustrated by the thickness of these discs at the center and ends of the helical conductors 30 and 31, as shown in FIGURE 1.

FIGURE 2 illustrates an improved sonde end connector useful in providing the desired stress distribution along and across the lower housing of the sonde without a torsional force acting at the end of the central conducting core 32. The uniform end connector comprises a back-up block 60 fitted with an interior opening through which the central conducting core 32 extends. A seal between these members is provided by O-ring 61. Back-up lock nut 62 is threaded to the end of the central conducting core 32 but is only finger tightened into contact with the end of the block 60. Thus the degree of prestress can be determined by the increase in space between nut 62 and the thrust washer as the screws 63 are tightened. As the set screws 63 circumferentially spaced about the back-up lock nut 62 are rotated into contact with the thrust washer and the block 60, the central conducting core 32 is placed in tension and the block 60 in compression, thus placing the series of discs 36 and discs 110 in compression. The exterior surfaces of the block are stepped near the attachment to nut 62 and threaded at 64 for attachment of nose cone 65. O-ring 66 provides a seal between the nose cone and block 60. The block is also stepped at its opposite end adjacent to discs 36 to provide a knurled linear segment 67 for attachment to outer resinous cover 37. Diametrically opposed keys 68 are provided for attachment of the lower ferrule 43.

FIGURES 7A and 7B illustrate a second embodiment of the present invention in which the improved end connector of FIGURE 2 is utilized to provide an improved but complementary stress distribution along and across sonde 10 of FIGURE 3. By the term "complementary," it is meant that the stress distribution of the sonde of FIGURES 7A and 7B is reversed to that of the sonde of FIGURE 1, being in tension at the radial edge of the sonde and in compression toward the center. In this manner, the central core of the discs 36' need not be used to accommodate a support mast or core, as in the previous embodiments of the invention, but may be utilized to form a support enclosure, as for accommodating a more delicately constructed antenna element, such as a skirted dipole antenna 88. In the present embodiment, the antenna 88 is fed from a source of electromagnetic energy by coaxial transmission line 89 supported centrally within the discs 36'.

The antenna consists of an outer conductor 89a (see FIGURE 8) slotted near the mid-point of the sonde and attached to a conducting metallic skirt 90 reentrantly formed with respect to the incoming energy through the line 89. Inner conductor 89b of the antenna preferably extends through the plane of attachment of the skirt 90 to the outer conductor 89a and terminates in contact with cylindrical member 91. Cylindrical member 91 is insulated from the skirt by an insulator 92 including a pair of discs and a spacer to prevent voltage breakdown between elements 90 and 91 during energization of the antenna. Member 91 is in contact with ceramic stressing rod 94 at its more remote end.

The inner surface of the skirt 90 is also insulated from the outer conductor 89a by ceramic cover 93 located in the annular space between these parts. In accordance with conventional antenna practice, the lengths of the skirt 90 and the member 91 are additive to form an effective antenna length of λ/2 to provide a pattern of emitted radiation that has a wide beam in elevation but is omnidirectional in azimuth.

To maintain the antenna in a correct axial location within the sonde, back-up collar 95 (see FIGURE 7B) contacts spring-loaded ceramic stressing rod 94 and member 91 therethrough. Back-up collar 95 has a stepped interior extension which contacts take-up collet 96 having a tapered surface on which is positioned an annular wedge 96a. A tension member 87a is attached to wedge 96a by take-up nut 96b threaded to collet 96. The tension member 97a is in surface contact with outer resinous sheath 87 and discs 36' across a mid-portion thereof and has an upper end attached between tapered block 97 and wedge 97a.

With the nose cone 65' removed from contact with collet 96, the desired stress distribution is applied to the sonde in the following manner: At the upper end of the sonde, thin strips of high-tensile strength material, say fiberglass tape having an ultimate strength of about 50,000 p.s.i., are looped at their ends about wedge 97a after which, as shown in FIGURE 7A, the wedge 97a is fitted to tapered block 97. After assembly, the strips of fiberglass tape constitute tension member 87a and are so positioned about the circumference of the wedge 97a that, when they are pulled taut in lines parallel to the axis of the antenna, their longitudinal edges overlap to form a unitary structure. Since tapered block 97 is fixed relative to the upper housing of the sonde, wedge 97a also fixes the tension member 87a to the upper housing.

After the upper end of the tension member 87a is secured, the discs 36' are assembled about the coaxial line 89 and dipole antenna 88 but interior to the tension member 87a. At the lower end of the sonde, back-up collar 95 and take-up collet 96 are inserted into contact with the termination of discs 36'. With collet 96 in contact with wedge 96a, the lower ends of the strips of tape constituting tension member 87a are drawn taut around the wedge 96a. The loops ends of strips are then fixedly secured relative to wedge 96a by rotating take-up nut 96b into contact therewith. After the tension member 87a is secured at the lower end of the sonde, set screws 96c projecting through take-up collet 96 are rotated into contact with back-up collar 97 through springs 97d. As relative axial movement between the collar 97 and collet 96 occurs, the discs 36' are axially compressed. Thereafter, sheath 87 is formed at the exterior of the tension member 87a having machined ends to accommodate ferrules 43' and 46'. Nose cone 65' is then secured to the threaded portion of take-up collet 96 and the lower housing is attached to the upper housing by union collar 22', as previously discussed.

Resinous sheath 87 is preferably formed of epoxy material containing reinforced fiberglass. In forming the sheath, conventional plastics-forming techniques may be used. For example, a fiberglass woven fabric may be wound about the tension member 87a at the exterior edges of the disc members. Upon the fiberglass fabric is placed a resin, a promoter and a dielectric compound. After the mixture has cured, the remote ends of the sheath are machined to accommodate the ferrules 43' and 46', as previously discussed.

Although the embodiment of FIGURES 7A and 7B is shown in combination with a dipole antenna, more conventional diagnostic equipment may be located within the sonde. For example, nuclear magnetism well logging equipment for detecting, at depth, the presence of fluids, such as hydrocarbons within an earth formation, may be housed within an enclosure formed by the tension member 87a and the discs 36'.

FIGURE 4 illustrates the logging sonde 10 of the present invention for detecting hydrocarbon fluids in an adjacent earth formation using the nuclear magnetic resonance characteristics of the protons of such fluids in a manner well understood in the well logging art. In this embodiment, the upper housing 20 of the sonde supports associated electronic circuitry by which polarizing coil 70 and receiving coil 71 in the lower housing 21 of the sonde respectively establish a magnetic field within the earth formation and receive nuclear magnetism signals from precessing protons of the fluids in the earth formation. The magnetic field of the polarizing coil 70 first aligns the protons of the fluids in a first direction as current is passed through input wires 80.

After a suitable polarization has been accomplished, the protons are permitted to relax toward alignment with a second magnetic field, usually the earth's magnetic field. In the process of relaxing, the protons act as small gyroscopes and precess about the direction of the second field. The precession of the protons establishes a rotating magnetic field detected by receiving coil 71. The signal thus detected is then transmitted to a recording device at the earth's surface through output wires 81. The relaxation of the protons is expressed in time and is measured from a characteristic of the signal transmitted to the recording device.

Preferably, but not necessarily, the polarizing and receiving coils 70 and 71 are engaged within a cylindrical support block 73 formed of either a series of disc members or of a single, unitary cylindrical construction, as indicated in FIGURE 4. In either design, the material forming the block is of a nonmagnetic, moldable character having physical properties compatible with the needs of nuclear magnetism well logging; for example, an epoxy material having a relatively low dielectric constant may be used.

The upper end of block 73 is located in contact with the lower housing support base 74; the lower end is spaced from, but effectively in contact with, a back-up plate 75. The peripheral edges are in surface contact with a series of disc members 77. Base 74, back-up plate 75 and disc members 77 have central openings axially aligned with the opening of the block 73 through which a central core member 76 may extend to connect the support base 74 to the back-up plate 75. Core member 76 is preferably of a material having nonmagnetic properties so that the signals received or emitted by coils 70 and 71 are minimally distorted.

To provide a desired stress distribution along the lower housing of the sonde, the disc members 77 are placed in compressive contact with each other and support base 74 in a manner similar to that previously explained in respect to the sonde of FIGURE 1. For example, stressing end cover 78 may be rotatably attached to the lower end of the core member 76. As the distance between the support base and the back-up plate 75 is reduced, the disc members 77 are compressed. In order to assure compressive contact, each of the holes within the disc members 77 must have an inside diameter less than the outside diameters of the support base 74 and the back-up plate 75. Owing to reactive forces, the core member 76 is tensioned as the disc members 77 are compressed. As previously explained, these tensioning forces also seat the upper shoulder 79 of the core 76 within a central recess in support base 74. To prevent rotation of the core as the end cover is attached, the cross section of the recess and the shoulder 79 may be rectangular, as indicated in FIGURE 5; but preferably the core is attached to the shoulder in a conventional fashion, as by a key or series of keys. Since the support base 74 is fixedly secured to the upper housing of the sonde through collar 22, the seating of the core within the recess also fixes these parts in a permanent axial relationship undisturbed during subsequent logging operations.

Various non-magnetic materials are suitable for forming the disc members 77. Preferably, the material chosen must have magnetic properties compatible with the needs of nuclear magnetism well logging to allow relative passage of the magnetic flux between the formation protons and the coil. Furthermore, the linear coefficients of expansion of the disc members, as an assembly, must also be controlled to match the total linear expansion of the central core member in the high temperature environment of a borehole, as previously explained. In this regard, several of the disc members may be formed of a material having a coefficient of linear expansion entirely different from that of the material forming the remainder of the discs. The alternative construction for the disc members is indicated in FIGURE 4 where discs of epoxy material are interspaced between discs of ceramic material. The number and length of each type of disc are varied to provide a combined average coefficient of expansion equal to that of the central core member.

To prevent fluids in the well bore from penetrating the logging sonde in the region of the disc members, cover 83 attaches to the periphery of the discs and extends the full length of the lower housing. It is preferably formed by reacting a curing agent with a resinous epoxy material having magnetic properties compatible with nuclear magnetism well logging. At the ends of the cover are located upper ferrule 84 and lower ferrule 85. Ferrules 84 and 85 have diametrically opposed keys 86 which key these ferrules to the support base 74 and back-up plate 75, respectively.

Attachment of the upper and lower housings of the sonde is by means of union collar 22 similar in construction to that previously described. The union collar 22 has first and second series of threads of opposed winding sense connecting to similarly wound but opposed threads on the upper and lower housings of the sonde, as previously explained.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:

1. A mechanically rigid well logging sonde for movably positioning an electrically insulated diagnostic element adjacent to an earth formation penetrated by a well bore to determine an electrical characteristic of said earth formation, comprising:
   (a) an elongated central housing having a longitudinal axis adapted to extend in the direction of said borehole, a side wall section forming an axially elongated portion of said sonde for defining a cavity therein for support of said diagnostic element and loading means for loading said side wall section in compression in said direction defined by said longitudinal axis of said housing,
   (b) said axial loading means including an axially elongated tension member coextensive with and exterior to said side wall section and clamping means attached to said tension member in engaging contact with the ends of said side wall section,
   (c) said clamping means including movable means at least at one end of said side wall section movable with respect to said side wall section and said tension member so as to develop axially directable compressional loads at the ends of said side wall section to load said side wall section in compression therealong thereby to increase the columnar stiffness in said central housing, while simultaneously to develop axially directable tension loads at said tension member to load said tension member in tension therealong.

2. A sonde as in claim 1 in which said elongated tension member exterior to said side wall section has end segments in tensionable contact with said clamping means.

3. A sonde as in claim 2 in which said clamping means includes a collet (96), wedging means in operative contact with said collet for securing one of said end segments of said tension member relative to said collet and said wedging means, fixed means at the other of said end segments in contact therewith, and axially movable means attachable within said collet for compressively contacting one end of said side wall section.

4. A mechanically rigid well logging sonde for movably positioning an electrically insulated diagnostic element adjacent to an earth formation penetrated by a well bore to determine an electrical characteristic of said earth formation, comprising:
   (a) an elongated central housing having (i) a longitudinal axis adapted to extend in the direction of said borehole, (ii) a side wall section forming an axially elongated portion of said sonde defining a cavity for support of said diagnostic element therein, and (iii) loading means for loading said side wall section in compression in said direction defined by said longitudinal axis, (b) said axial loading means including an axially elongated tension member coextensive with said side wall and clamping means attached to said tension member in engaging contact with the ends of said side wall section, said clamping means including movable means at least at one end of said side wall section movable with respect to said side wall section and said tension member so as to develop axially directable compressional loads at the end of said side wall section to load said side wall section in compression therealong thereby to increase the columnar stiffness of said central housing, while simultaneously to develop axially directable tension loads at said tension member to load said tension member in tension therealong, said side wall section including a series of discs having colinear axes and being axially stacked in abutting surface contact with each other coextensive with said tension member, said series of discs including at first and second sets of discs formed of materials having different coefficients of thermal expansion but adapted, when combined to form said series of discs, to have an average coefficient of expansion therefor substantially equal to that of said tension member over a range of temperatures normally occurring in traversing said sonde through said borehole.

5. A mechanically rigid logging sonde for movably positioning an electromagnetic antenna element adjacent to an earth formation penetrated by a well bore to determine the distance to a dielectric discontinuity in said formation from said borehole by measuring the two-way travel time of electromagnetic energy generated with respect to and received within said sonde, comprising:
   (a) an axial elongated upper housing supporting electromagnetic energization circuitry, including a source of electromagnetic energy and a receiver adapted to be connected to said antenna element,
   (b) an elongated housing connected to said upper housing and having a longitudinal axis adapted to extend in the direction of said borehole, and a side wall section forming an axially elongated portion of said sonde so as to define a cavity adapted to support said antenna element, said lower housing also including loading means for loading said side wall section in compression in said direction defined by said longitudinal axis, comprising an axially elongated cylindrical metal tension member coextensive with and located interior of said side wall section within said cavity, and clamping means attached to said tension member in engagement with the ends of said side wall section,
   (c) said side wall section including a series of annular discs axially stacked in abutting contact with each other coextensive with and exterior to said tension member, said discs being formed of materials capable of passing electromagnetic energy and including a multiplicity of serpentining grooves at the outer edges thereof in supporting contact with a plurality of metallic helical conductors disposed therein, said helical conductors and said tension member adapted to form a helical antenna connectable to said electromagnetic source and receiver in said upper housing to pass electromagnetic energy relative to said series of discs to determine said distance to said discontinuity by measuring the two-way travel time of said electromagnetic energy.

6. A sonde as in claim 5 in which said series of discs includes first and second sets of discs formed of materials having different coefficients of thermal expansion but adapted, when combined to form said series of discs, to have an average coefficient of expansion therefor substantially equal to that of said tension member over a range of temperatures normally occurring in traversing said sonde through said borehole.

7. A sonde as in claim 5 in which said earth formation is a salt body and said discontinuity is the side of said salt body.

8. A mechanically rigid logging sonde for movably positioning an electromagnetic antenna element adjacent to an earth formation penetrated by a well bore to determine the distance to a dielectric discontinuity in said formation from said borehole by measuring the two-way travel time of electromagnetic energy generated with respect to and received within said sonde, comprising:
   (a) an elongated upper housing supporting electromagnetic energization circuitry, including a source of electromagnetic energy and a receiver adapted to be connected to said antenna element.
   (b) an elongated lower housing connected to said upper housing and having a longitudinal axis adapted to extend in the direction of said borehole, and a side wall section forming an axially elongated portion of said sonde so as to define a cavity adapted to support said antenna element,
   (c) said lower housing also including loading means for loading said side wall section in compression in said direction defined by said longitudinal axis, said loading means comprising an axially elongated tension member coextensive with and radially located exterior of said side wall section, and clamping means attached to said tension member in engagement with the ends of said side wall section, said clamping means including movable means at least at one end of said side wall section movable with respect to said side wall section and said tension member so as to develop axially directable compressional loads at the ends of said side wall section to load said side wall section in compression therealong thereby to increase the columnar stiffness of said lower housing, while, simultaneously, to develop axially directable tension loads at said tension member to load said tension member in tension therealong.

9. A sonde as in claim 8 in which said clamping means includes a collet (96), wedging means in operative contact with said collet for securing one end of said tension member relative to said collet and said wedging means, fixed means at the other end of said tension member in fixed contact therewith, and axially movable means attachable within said collet for compressively contacting one end of said side wall section.

10. A sonde as in claim 8 in which said side wall comprises a series of annular discs axially stacked in abutting contact with each other interior to and coextensive with said tension member.

11. A sonde as in claim 10 in which said series of discs and said tension member are former of materials capable of substantially passing electromagnetic energy therethrough.

12. A sonde as in claim 11 in which said series of discs are adapted to support an electromagnetic dipole antenna therein.

References Cited
UNITED STATES PATENTS

| | | | |
|---|---|---|---|
| 2,725,523 | 11/1955 | Doll | 324—6 |
| 3,079,549 | 2/1963 | Martin | 324—6 XR |
| 3,249,858 | 5/1966 | Gouilloud | 324—6 |
| 3,286,163 | 11/1966 | Holser et al. | 324—6 |
| 3,327,203 | 6/1967 | Attali | 324—6 |

RUDOLPH V. ROLINEC, *Primary Examiner.*

GERARD R. STRECKER, *Assistant Examiner.*